United States Patent
Hoffmann et al.

(10) Patent No.: US 6,826,629 B2
(45) Date of Patent: Nov. 30, 2004

(54) APPARATUS AND METHOD FOR ENHANCING LEARNING ABILITY AND BEHAVIOR FOR A COMPUTER PERIPHERAL DEVICE

(75) Inventors: Brian E. Hoffmann, Boise, ID (US); Loay Abu-Husein, Boise, ID (US); David A. Martz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 384 days.

(21) Appl. No.: 09/947,983

(22) Filed: Sep. 6, 2001

(65) Prior Publication Data

US 2003/0046454 A1 Mar. 6, 2003

(51) Int. Cl.[7] .............................. G06F 3/00; G06F 13/12
(52) U.S. Cl. .............................................. 710/5; 710/62
(58) Field of Search ................................. 710/10, 8, 11, 710/5, 62; 358/1.13; 715/505; 345/467; 709/223

(56) References Cited

U.S. PATENT DOCUMENTS

| | | | | | |
|---|---|---|---|---|---|
| 5,526,477 | A | * | 6/1996 | McConnell et al. | 345/467 |
| 6,418,486 | B1 | * | 7/2002 | Lortz et al. | 710/10 |
| 6,501,557 | B1 | * | 12/2002 | Abe | 358/1.13 |
| 2001/0016870 | A1 | * | 8/2001 | Van Der Meer | 709/203 |
| 2002/0131065 | A1 | * | 9/2002 | Sweetland et al. | 358/1.13 |
| 2002/0171857 | A1 | * | 11/2002 | Hisatomi et al. | 358/1.13 |
| 2003/0088828 | A1 | * | 5/2003 | Ackaret | 715/505 |

\* cited by examiner

*Primary Examiner*—Jeffrey Gaffin
*Assistant Examiner*—Joshua D Schneider

(57) ABSTRACT

A computer peripheral device learning apparatus includes a host computer, a communication path, and a computer peripheral device. The host computer includes a peripheral device driver configured to generate an output job. The computer peripheral device communicates with the host computer via the communication path. The computer peripheral device is configured to generate an output job in a first output job format. Furthermore, the computer peripheral device is operative to receive instructions from an external source on how to generate an output job in a second output job format. A method is also provided.

16 Claims, 4 Drawing Sheets

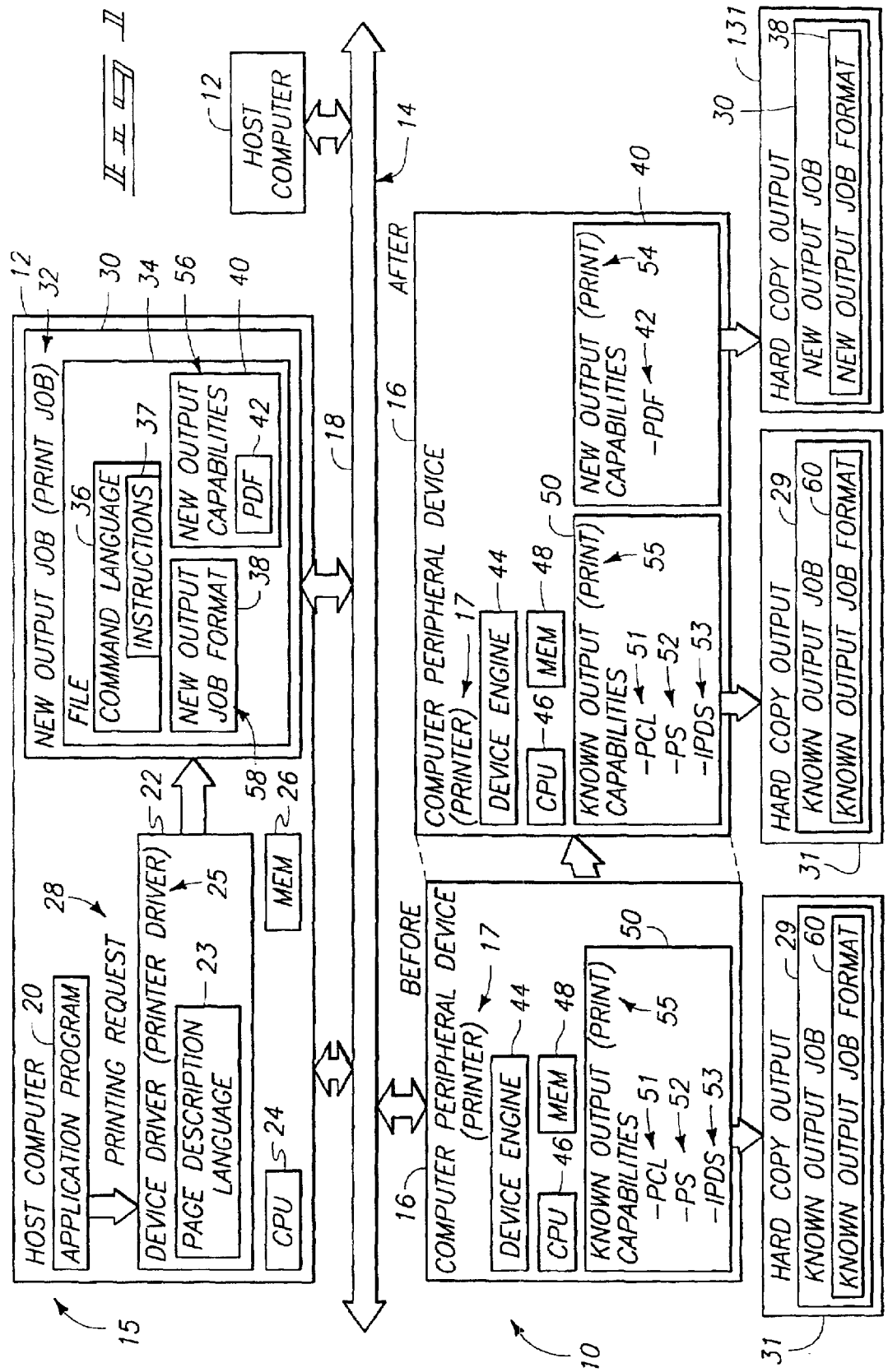

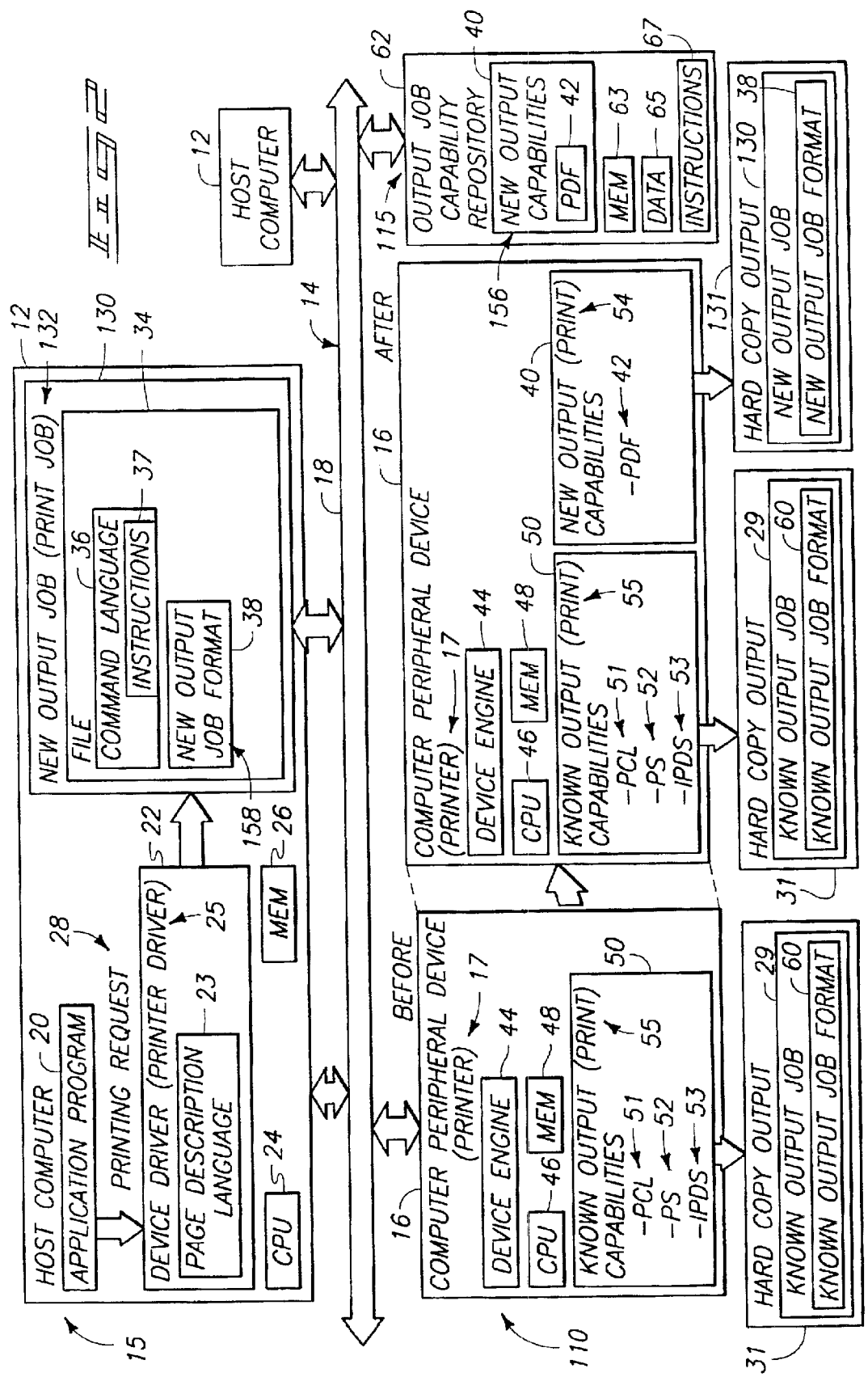

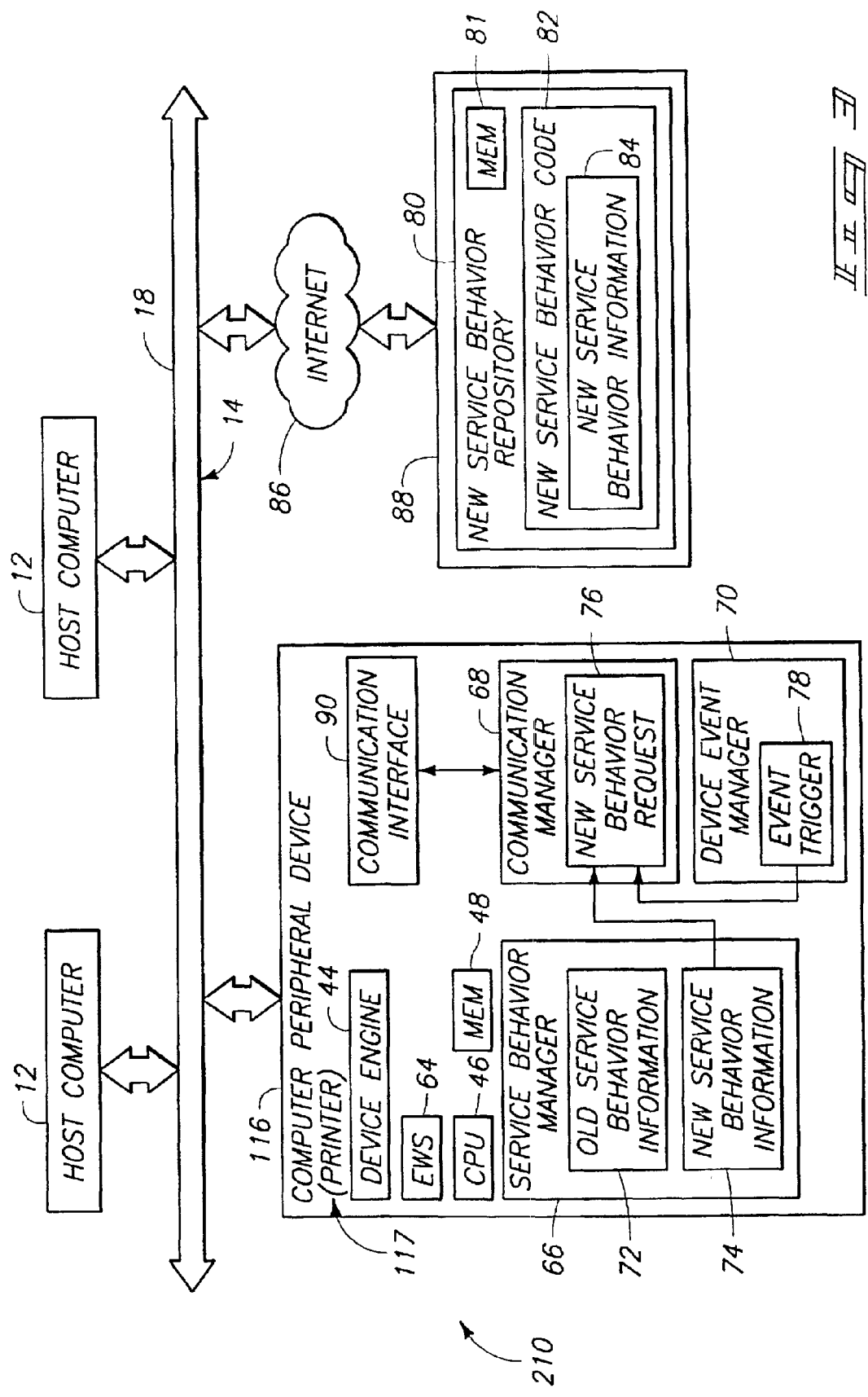

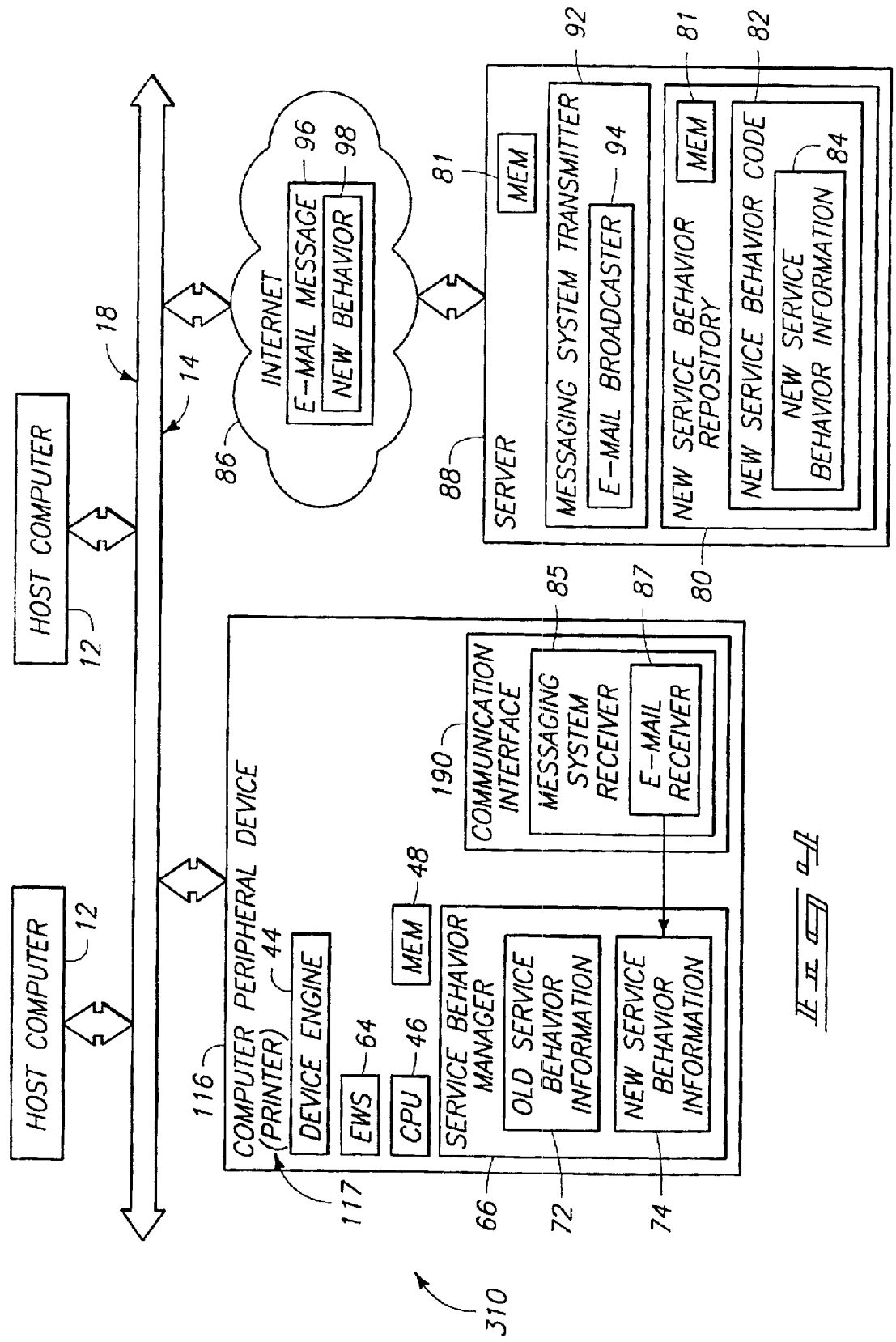

APPARATUS AND METHOD FOR ENHANCING LEARNING ABILITY AND BEHAVIOR FOR A COMPUTER PERIPHERAL DEVICE

FIELD OF THE INVENTION

The invention pertains to functional capabilities of computer peripheral devices. More particularly, this invention relates to new service behavior and output job capabilities enhancement for computer peripheral devices such as new service behavior learning and print job learning for printers.

BACKGROUND OF THE INVENTION

Computer peripheral devices such as printers convert computer output into output in the form of printed images comprising text and/or graphics. By example, a personal computer that is connected with a printer includes a printer driver comprising a software routine that converts an application program's printing request into a command language that is understood by the printer. More particularly, the specific command set used by a particular printer forms a dedicated set of commands that are native to the printer. The printer driver, once installed at a PC, makes the printer's command set transparent to a user at the PC. However, there exists a need to be able to modify the capabilities of a computer peripheral device after it has been manufactured and installed within an operating environment so that new command languages can be understood by a computer peripheral device.

According to prior art techniques, PostScript printer drivers create a file that is accepted by PostScript printers. Hewlett Packard printer drivers create PCL files. Drivers for some Windows-only printers rasterize pages via a raster image processor (RIP) function, then send the bit patterns to the printer. However, each printer is preconfigured at the time of manufacture to recognize a single language that is understood by the printer. Hence, there exists a need to enhance the ability of a computer peripheral device so it can learn new output job capabilities. Furthermore, there exists a need to enhance the ability of a computer peripheral device to learn new service behavior.

SUMMARY OF THE INVENTION

An apparatus and method are provided for enhancing new service behavior and output job capabilities for computer peripheral devices. For example, new service behavior learning and print job learning can be provided for printers.

According to one aspect, a computer peripheral device learning apparatus includes a host computer, a communication path, and a computer peripheral device. The host computer includes a peripheral device driver configured to generate an output job. The computer peripheral device communicates with the host computer via the communication path. The computer peripheral device is configured to generate an output job in a first output job format. Furthermore, the computer peripheral device is operative to receive instructions from an external source on how to generate an output job in a second output job format.

According to another aspect, a service behavior learning apparatus is provided for a computer peripheral device. The service behavior learning apparatus includes a repository, a communication network, and a computer peripheral device. The repository is configured to store new service behavior information for a computer peripheral device. The computer peripheral device communicates with the repository via the communication network. The computer peripheral device is configured to retrieve new service behavior information from the repository. Furthermore, the computer peripheral device is operative to enable new service behavior capabilities at the computer peripheral device using the retrieved information.

According to yet another aspect, a method is provided for enhancing functional capabilities for a computer peripheral device. The method includes: identifying a new functional capability for the computer peripheral device; receiving the new functional capability at the computer peripheral device; and updating the computer peripheral device to include the new functional capability.

DESCRIPTION OF THE DRAWINGS

Preferred embodiments of the invention are described below with reference to the following accompanying drawings depicting examples embodying the best mode for practicing the invention.

FIG. 1 is a functional block diagram illustrating a computer peripheral device learning apparatus according to one aspect of the invention.

FIG. 2 is a functional block diagram illustrating a computer peripheral device learning apparatus according to another aspect of the invention.

FIG. 3 is a functional block diagram illustrating a service behavior learning apparatus for a computer peripheral device according to even another aspect of the invention.

FIG. 4 is a functional block diagram illustrating a service behavior learning apparatus for a computer peripheral device according to yet even another aspect of the invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Reference will now be made to several preferred embodiments of Applicant's invention. Four exemplary implementations are described below and depicted with reference to the drawings comprising a computer peripheral device learning apparatus and a service behavior learning apparatus, shown in four distinct embodiments. While the invention is described by way of these preferred embodiments, it is understood that the description is not intended to limit the invention to these embodiments, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

A computer peripheral device learning apparatus according to one aspect of the invention is identified in FIG. 1 by reference numeral 10. Learning apparatus 10 comprises one or more of a plurality of host computers 12, a communication path 14, and a computer peripheral device 16. Host computer 12 provides one version of an external source 15 for an output job 30 that is delivered to computer peripheral device 16. According to one implementation, computer peripheral device 16 comprises a printer 17, such as a laser printer or an ink jet printer or any other embedded device. Also according to one implementation, communication path 14 comprises a network 18 such as a local area network (LAN), a wide area network (WAN), or a communications network.

Host computer 12 includes an application program 20, a computer peripheral device driver 22, a central processing unit (CPU) 24, and memory 26. Computer peripheral device driver 22 is configured to generate an output job 30 in response to application program 20 generating an output device request, such as a printing request 28. When computer peripheral device driver 22 comprises a printer driver 25, one or more page description languages 23 is used to generate a new output job 30 in the form of a print job 32.

Output job 30 comprises a file 34 including a command language 36, a new output job format 38, and a new output capability format 40. Command language 36 takes the form of instructions 37. As shown in FIG. 1, one new output capability 40 comprises a portable document file (PDF) format 42.

Computer peripheral device 16 comprises device engine 44, central processing unit (CPU) 46, memory 48, and known output capabilities 50. When device 16 is a printer 17, device engine 44 is a print engine.

When computer peripheral device 16 comprises a printer 17, known output capabilities 50 in one instance comprise print capabilities, such as printer rendering languages. Several such known rendering languages of capabilities 50 comprise printer control language PCL 51, PostScript (PS) 52, and Intelligent Printer Data Stream (IPDS) 53.

PCL 51 comprises a command language for LaserJet printers manufactured and sold by Hewlett-Packard Company, assignee of the present invention. PCL has become a de facto standard as used in many printers, typesetters, and multiple function peripheral (MFP) devices.

PS, or PostScript, 52 comprises a page description language (PDL) available from Adobe Systems Inc., of Mountain View, Calif. PostScript 52 is used extensively on many computer platforms, so much that PostScript 52 is a de facto standard in many commercial typesetting and printing houses. Most computer platforms accept and some may even require PostScript files be used as an electronic input. However, PostScript commands do not drive the printer directly. The Postscript commands comprise language statements in ASCII text that are translated into the printer's machine language by a PostScript interpreter that is built into the printer. Fonts are then scaled to size using an interpreter, thereby eliminating any need to store a variety of font sizes on disk.

IPDS 53 comprises a native format that is built into IBM laser printers. IPDS 53 accepts fonts and formatted raster images. One major function of IPDS is providing a communications protocol that negotiates printer transfers from servers in a network that perform rasterization.

As shown in FIG. 1, printer 17 is previously enabled, such as during manufacture, with known output capabilities 50 such as PCL 51, PS 52, and IPDS. As a result, printer 17 is able to generate a hard copy output 31 comprising a known output job 29 having a known output job format 60 that corresponds with one of the known output capabilities 50, upon receiving an output job 30 from external source 15 that corresponds therewith.

By way of the novel aspects of the present invention, printer 17 receives a new output capability 40 and a new output job format 38 from external source 15, here shown as a host computer 12. A "BEFORE" and "AFTER" configuration of printer 17 is shown in FIG. 1, wherein "BEFORE" illustrates the output capabilities of printer 17 before and "AFTER" illustrates the output capabilities after implementing the features of the present invention.

More particularly, "BEFORE" illustrates printer 17 generating hard copy output 31 comprising a known output job 29. "AFTER" illustrates printer 17 with the newly enabled capability to generate hard copy output 131 comprising a new output job 30 in a new output job format 38, in addition to the capability to generate hard copy output 31 comprising known output job 29.

As shown in the "AFTER" depiction of FIG. 1, printer 17 has been updated with new output capabilities 40, in this case new print capabilities, received from output job 30 from external device 15. According to one implementation, the new output capabilities 40 comprise the ability to generate a new output job 30 in the format of PDF 42, for example. Accordingly, a new capability has been added to printer 17 in the form of being able to generate output in a new rendering language that was not previously possible with printer 17.

FIG. 1 illustrates one aspect of the invention wherein a print job learning ability is imparted to printer 17. More particularly, host computer 12 renders a print job 32 that contains information on a new print capability comprising a prefixed print capability. Print job 32 comprises a first block (block A) 56 and a second block (block B) 58. A block refers to a group of bits that are transferred together.

First block 56 comprises a header that describes what is in the respective block 56. First block 56 is transmitted by host computer 12 to printer 17 prior to second block 58. First block 56 also includes prefix information comprising a preamble and a header. The preamble identifies "Here's a new PDL". The header identifies "This PDL is in PDF".

The second block 58 comprises a header describing what is in the block as well as PDF data. More particularly, block 58 comprises a first section of data that identifies a procedure indicating how to print in PDF format. Block 58 further comprises a second section of data that includes the PDF data that defines the print job.

One form of header comprises a Printer Job Language (PJL) header. PJL comprises a printer command language from Hewlett-Packard Company, of Palo Alto, Calif., that adds control for individual print jobs and also includes the ability to set printer default settings.

In essence, host computer 12 has embedded information into file 34 of print job 32 that identifies how to print an output job 30 in a new output job format 38. In this case, the new print capability 54 comprises printing using PDF 42 as a format. Prefix information is provided via first block 56 that tells how to print the output job. Essentially, first block 56 tells how to print in PDF format. If printer 17 already knows how, then printer 17 ignores this information in first block 56. Printer 17 then looks through the data in second block 58, studying the data until it finds a header block within second block 58. The header block of second block 58 describes what else is in second block 58; namely PDF print data, in this case. Accordingly, first block 56 contains instructions and data indicating how to print second block 58.

By way of example, a header in first block 56 is provided in PCL 51. Such header describes what else is in block 56. More particularly, prefix information in block 56 identifies that there is a new language (PDL), and that the new PDL is in PDF. Second block 58 tells how to print in PDF format, and also contains PDF data that needs to be printed by printer 17.

If printer 17 already knows the new language, it goes on to the next header, ignoring the remainder of first block 56. If printer 17 does not know the new language, printer 17 stores the rest of first block 56 as data and/or instructions in memory, such as on a hard disk, on RAM, on flash memory, or on some other memory media.

In contrast, prior art techniques give an error message when encountering a print job comprising a new printer language, which is unknown. Alternatively, the prior art printer simply ignores the data from the print job. For example, if a PostScript print job is sent to a printer that does not support PostScript, the printer generates garbage, or an error message is generated.

According to the one implementation, printer 17 is imparted with the ability to learn new behavior by receiving an unknown printer job type. For example, printer 17 can be initially configured to receive an output job in a first, known output job format and generate output comprising the known output job, in the form of a print job. Via communication path 14, printer 17 communicates with host computer 12. Printer 17 is operative to receive instructions from an external source on how to generate an output job in a second output job format.

In FIG. 2, a computer peripheral device learning apparatus according to another aspect of the invention is identified by reference numeral 110. More particularly, FIG. 2 illustrates anther aspect of the invention, similar to that shown in FIG. 1, but wherein a print job learning ability is imparted to printer 17 from an external source. More particularly, printer 17 learns a new print job capability from an external source 115, such as a host computer, in the form of an output job capability repository 62. Accordingly, external source 115 differs from external source 15 (of FIG. 1).

Output job capability repository 62 comprises one or more new output capabilities 40, memory 63, data 65, and instructions 67. New output capabilities 40 in one case comprises the ability to print documents in PDF 42.

Output job 130 is similar to output job 30 (of FIG. 1). However, output job 130 comprises a print job 132 that does not include new output capabilities. Instead, new output capabilities 40 are retrieved from repository 62.

New output job format 38 is sent from external device 15 via communication path 14 to printer 17. When a new, or unknown, document type is used by new output job format, a header is provided in a block 158 of new output job format 38 that identifies the new language. For example, new output job format 38 comprises a block 158 that identifies the new language as PDF. Additionally, block 158 comprises data in PDF format. Such data is then stored in memory 63 of repository 62, while a fetch is implemented to retrieve PDF 42 capabilities from new output capabilities 40. The PDF capabilities are then sent in the form of another block 156 via communication path 14 to printer 17 where PDF 42 capabilities are loaded. While this fetch is implemented, I/O is stopped.

"BEFORE" indicates the status of printer 17 before receiving print job 132. "AFTER" indicates the status of printer 17 after receiving print job 132 and doing a fetch to retrieve and load PDF 42 capabilities. Where print job 132 comprises an unknown type of print job, a new capability, such as PDF 42 capability, is fetched from repository 62 to realize the "AFTER" status.

With reference to FIGS. 1 and 2, it is understood that known output job 29 in known output job format 60 and new output job 30, 130 in new output job format 38 of hard copy outputs 31 and 131, respectively, do not actually exist within hard copy outputs 31 and 131. However, known output job 29 and new output job 30, 130 are programs generated within computer peripheral device 16 which are sent via code to printer 17 in order to generate hard copy outputs 31 and 131. Known output job 29 and new output job 30, 130 are illustrated within hard copy outputs 31 and 131 in order to illustrate the association relative to hard copy outputs 31 and 131.

In FIG. 3, a service behavior learning apparatus for a computer peripheral device according to even another aspect of the invention is identified by reference numeral 210. FIG. 3 depicts one aspect of the present invention, wherein self-initiated service behavior learning occurs via device events in a printer 117. At least one host computer 12 is connected via a communication path 14 with a computer peripheral device 116. In one case, communication path 14 comprises a network 1 8 that connects with the Internet 86. Also in one case, computer peripheral device 116 comprises printer 117.

A server 88 is coupled with network 18 via the Internet 86. Server 88 comprises a new service behavior repository 80 comprising memory 81 and new service behavior code 82 stored on the memory 81. New service behavior code 82 comprises new service behavior information 84.

Printer 117 comprises a device engine 44 such as a print engine, an embedded web server (EWS) 64, a central processing unit (CPU) 46, memory 48, a service behavior manager 66, a communication interface 90, a communication manager 68, and a device event manager 70. Service behavior manager 66 comprises old service behavior information 72 and new service behavior information 74. Communication manager 68 comprises a new service behavior request 76. Device event manager 70 comprises an event trigger 78.

As shown in FIG. 3, service behavior learning is self-initiated via device events that occur at printer 117. More particularly, an event is received or occurs at printer 117. If printer 117 does not recognize the event, printer 117 initiates communication with repository 80 via Internet 86 and network 18. Printer 117 then retrieves information from repository 80 on how to handle the unrecognized event. In general, repository 80 tells printer 117 what to do with a set of circumstances surrounding this event.

By way of example, one event comprises the addition of an envelope feeder to printer 117, after initial purchase from the manufacturer. By detecting the presence of the envelope feeder via a sensor, printer 117 does not know what to do. Therefore, printer 117 retrieves code 82 from repository 80 that details what to do when an envelope feeder is added onto printer 117. More particularly, such code 82 comprises information 84 on how to adjust an internal menu that detail sources for print media entering printer 117. In such case, an input tray comprising an envelope feeder is added to the menu as another possible input choice when submitting print jobs to printer 117.

It is understood that communication over communication path 14 is bi-directional. In one case, server 88 can push new service behavior code 82 to printer 117 via push fulfillment. In another case, printer 117 can pull new service behavior code 82 from server 88.

In FIG. 4, a service behavior learning apparatus for a computer peripheral device according to yet even another aspect of the invention is identified by reference numeral 310. FIG. 4 depicts another aspect of the present invention, wherein new service behavior for printer 117 is initiated by broadcasting a new service behavior over a network 18 using the Internet 86. At least one host computer 12 is connected via a communication path 14 with a computer peripheral device 116. In one case, communication path 14 comprises a network 18 that connects with the Internet 86. Also in one case, computer peripheral device 116 comprises a printer 117, similar to the one shown in FIG. 3.

A server 88 is coupled with network 18 via the Internet 86. Server 88 comprises a new service behavior repository 80 comprising memory 81 and new service behavior code 82 stored on the memory 81. New service behavior code 82 comprises new service behavior information 84.

Printer 117 comprises a device engine 44 such as a print engine, an embedded web server (EWS) 64, a central processing unit (CPU) 46, memory 48, a service behavior manager 66, and a communication interface 190. Service behavior manager 66 comprises old service behavior information 72 and new service behavior information 74. Communication interface 190 comprises a messaging system receiver 85 including an e-mail receiver 87.

As shown in FIG. 4, Internet 86 comprises an e-mail message 96 including information on new behavior 98 for printer 117 that is delivered from server 88 to printer 117. E-mail message 96 is generated and delivered by an e-mail system that uses a messaging system that provides a store and forward capability and a mail program that provides a user interface with send and receive functions.

Such e-mail system includes e-mail receiver 87 of printer 117 and an e-mail broadcaster 94 of a messaging system transmitter 92 of server 88. Server 88 comprises a new service behavior repository 80 and messaging system transmitter 92. New service behavior repository 80 comprises memory 81 and new service behavior code 82 including new service behavior information 84. In one case, server 88 comprises a manufacturer web server that is connected with the Internet 86. Accordingly, server 88 can be used to push, or broadcast, new service behavior information to printer 117 via EWS 64 and/or communication interface 190.

In operation, EWS 64 and the messaging system comprising messaging system receiver 85 cooperate such that e-mail is received by printer 117 indicating the new behavior. Examples of new service behavior information 84, rendered in code 82, and sent as new behavior 98 include sending an e-mail message 96 indicating a timetable for scheduled diagnostics for printer 117 as identified by the manufacturer. Other examples include sending preventive maintenance procedures for printer 117, sending new service references and/or locations of additional repositories to printer 117, and sending new device event triggering schedules to printer 117.

Accordingly, service behavior learning apparatus 310 is provided for computer peripheral device 116 in the form of printer 117. A repository of apparatus 310 is configured to store new service behavior information 84 for computer peripheral device 116. Computer peripheral device 116 communicates with repository 80 via communication network 18. Computer peripheral device 116 is configured to retrieve new service behavior information 84 from repository 80, and is operative to enable new service behavior capabilities at the computer peripheral device using the retrieved new service behavior information 84 contained in new behavior 98 of e-mail message 96.

A method is also provided for enhancing functional capabilities for a computer peripheral device. The method includes identifying a new functional capability for the computer peripheral device. Next, the method entails receiving the new functional capability at the computer peripheral device. Furthermore, the method includes updating the computer peripheral device to include the new functional capability.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computer peripheral device learning apparatus, comprising:
   a host computer including a peripheral device driver configured to generate an output job;
   a communication path;
   a computer peripheral device communicating with the host computer via the communication path, configured to generate an output job in a first output job format, and operative to receive instructions from an external source on how to generate an output job in a second output job format if it is determined that the computer peripheral device is not configured to generate the output job in the second output job format, wherein the computer peripheral device receives instructions embedded within an output job from the host computer detailing how to generate the output job in the second output job format.

2. The peripheral device learning apparatus of claim 1 wherein the external source comprises the host computer.

3. The peripheral device learning apparatus of claim 1 wherein the external source comprises a repository having memory for storing data for an output job having the second output job format, wherein the host computer provides an output job with the second output job format to the repository via the communication path, and wherein the computer peripheral device, in response to receiving the output job having the second output job format, fetches instructions from the repository on how to generate an output job in the second output job format.

4. The peripheral device learning apparatus of claim 1 wherein the computer peripheral device is further operative to receive output data in the second output job format.

5. The peripheral device learning apparatus of claim 1 wherein the second output job format comprises a new rendering language for the computer peripheral device.

6. The peripheral device learning apparatus of claim 5 wherein the new rendering language comprises a portable document format (PDF) file format.

7. The peripheral device learning apparatus of claim 5 wherein the computer peripheral device comprises a printer, and the first and second output job formats each comprise respective first and second print job formats.

8. The peripheral device learning apparatus of claim 1 wherein the computer peripheral device comprises a printer, and the instructions from the host computer are provided within a print job generated by the host computer and delivered to the printer.

9. The peripheral device learning apparatus of claim 8 wherein the print job comprises a first block and a second block, the output job format comprises a new print job format, and wherein the first block describes how to print information contained in the second block in the new print job format.

10. The peripheral device learning apparatus of claim 1 wherein the instructions comprise command language instructions of the output job generated by the computer peripheral device.

11. The apparatus of claim 1, wherein the computer peripheral device automatically communicates with the external source if the computer peripheral device is not capable of independently rendering the output job in the second output job format.

12. The apparatus of claim 1, wherein the output job in the second output job format can be rendered by the computer peripheral device even if the computer peripheral device is not independently configured to render the output job in the second output job format.

13. The apparatus of claim 1, wherein information to generate the output job in the second output job format is pushed to the computer peripheral device from the external source.

14. The apparatus of claim 1, wherein information to generate the output job in the second output job format is pulled from the external source to the computer peripheral device.

15. A method of enhancing functional capabilities for a computer peripheral device, comprising:

identifying a new functional capability for the computer peripheral device;

receiving, from a host computer, the new functional capability at the computer peripheral device via instructions embedded in an output job from the host computer; and updating the computer peripheral device to include the new functional capability.

16. The method of claim 15 wherein the new functional capability is identified within a print job that is delivered to the computer peripheral device via a communication link.

* * * * *